US012795601B2

(12) United States Patent
Gambold et al.

(10) Patent No.: US 12,795,601 B2
(45) Date of Patent: Nov. 10, 2026

(54) OPTIMIZED COMMUNICATION AMONG UNMANNED AERIAL VEHICLES

(71) Applicants: University of North Texas, Denton, TX (US); Unmanned Experts Inc., Denver, CO (US)

(72) Inventors: Keven Gambold, Denver, CO (US); Shane Nicoll, Denver, CO (US); Batool Dalloul, Denver, CO (US); Kamesh Namuduri, Denton, TX (US); Skyler Hawkins, Denton, TX (US); Mathias Kidane, Denton, TX (US)

(73) Assignees: University of North Texas; Unmanned Experts Inc.

( * ) Notice: Subject to any disclaimer, the term of this patent is extended or adjusted under 35 U.S.C. 154(b) by 181 days.

(21) Appl. No.: 18/924,956

(22) Filed: Oct. 23, 2024

(65) Prior Publication Data

US 2026/0129612 A1 May 7, 2026

(51) Int. Cl.
*H04W 64/00* (2009.01)
*H04W 76/14* (2018.01)
*H04W 84/06* (2009.01)

(52) U.S. Cl.
CPC ......... *H04W 64/006* (2013.01); *H04W 76/14* (2018.02); *H04W 84/06* (2013.01)

(58) Field of Classification Search
None
See application file for complete search history.

(56) References Cited

U.S. PATENT DOCUMENTS

2024/0118365 A1* 4/2024 Shuman .................. G01S 19/51

* cited by examiner

*Primary Examiner* — Suhail Khan
(74) *Attorney, Agent, or Firm* — The Pattani Law Group

(57) ABSTRACT

The present disclosure contemplates techniques for optimizing communication among unmanned aerial vehicles (UAVs). A transmitting UAV may receive, from a second UAV, safety information indicating movement of the second UAV; determine, based on analyzing the safety information, potential occurrence of a situation related to the movement of the second UAV; determine, based on determining the potential occurrence of the situation, that the first UAV and the second UAV are to communicate directly; transmit, to the second UAV based on determining that the first UAV and the second UAV are to communicate directly, an initiation message to enable establishment of a direct communication session between the first UAV and the second UAV; and directly communicate, with the second UAV via the direct communication session, coordination information to coordinate real-time movement of the first UAV or the second UAV to address the potential occurrence of the situation. Various other aspects are contemplated.

20 Claims, 8 Drawing Sheets

OPTIMIZED COMMUNICATION AMONG UNMANNED AERIAL VEHICLES

GOVERNMENT STATEMENT

This invention was made with Government support under FAA 8679-22-P-0778 awarded by the United States Air Force AFWERX AGILITY PRIME. The Government has certain rights in the invention.

FIELD OF DISCLOSURE

Aspects of the present disclosure generally relate to use of hardware and/or software for enabling communication among devices, and in particular to optimized communication among unmanned aerial vehicles (UAVs).

BACKGROUND

An unmanned aerial vehicle (UAV) may be described as an electronically powered, aerial vehicle that does not carry a human pilot. A UAV may utilize aerodynamic forces to provide lift, and may fly based at least in part on utilizing onboard processors that execute commands received from a ground control station (GCS).

UAVs come in various shapes, sizes, and configurations, and have gained significant prominence across various sectors due to their versatility, cost-effectiveness, and technological advancements. Both military and civilian sectors utilize UAVs extensively. For instance, the military sector utilizes UAVs to conduct surveillance missions, reconnaissance missions, combat missions, and rescue operations. Similarly, civilian entities utilize UAVs for purposes such as recreational activities, search and rescue missions, delivery of goods, transportation, and infrastructure inspection.

SUMMARY

In an aspect, the present disclosure contemplates a first UAV operating in airspace, the transmitting UAV comprising: a processor; and a memory communicatively coupled to the processor, the processor and the memory being configured to: receive, from a second UAV, safety information indicating movement of the second UAV in the airspace; determine, based at least in part on analyzing the safety information, potential occurrence of a situation related to the movement of the second UAV in the airspace; determine, based at least in part on determining the potential occurrence of the situation, that the first UAV and the second UAV are to communicate directly; transmit, to the second UAV based at least in part on determining that the first UAV and the second UAV are to communicate directly, an initiation message to enable establishment of a direct communication session between the first UAV and the second UAV; and directly communicate, with the second UAV via the direct communication session, coordination information to coordinate real-time movement of the first UAV or the second UAV to address the potential occurrence of the situation.

In one aspect, the present disclosure contemplates a method comprising: receiving, by the first unmanned aerial vehicle (UAV) from a second UAV, safety information indicating movement of the second UAV in an airspace; determining, by the first UAV based at least in part on analyzing the safety information, potential occurrence of a situation related to the movement of the second UAV in the airspace; determining, by the first UAV based at least in part on determining the potential occurrence of the situation, that the first UAV and the second UAV are to communicate directly; transmitting, by the first UAV to the second UAV based at least in part on determining that the first UAV and the second UAV are to communicate directly, an initiation message to enable establishment of a direct communication session between the first UAV and the second UAV; and directly communicating, by the first UAV with the second UAV via the direct communication session, coordination information to coordinate real-time movement of the first UAV or the second UAV to address the potential occurrence of the situation.

In another aspect, the present disclosure contemplates a non-transitory computer-readable medium configured to store instructions, which when executed by a processor associated with a first unmanned aerial vehicle (UAV) operating in airspace, configure the processor to: receive, from a second UAV, safety information indicating movement of the second UAV in the airspace; determine, based at least in part on analyzing the safety information, potential occurrence of a situation related to the movement of the second UAV in the airspace; determine, based at least in part on determining the potential occurrence of the situation, that the first UAV and the second UAV are to communicate directly; transmit, to the second UAV based at least in part on determining that the first UAV and the second UAV are to communicate directly, an initiation message to enable establishment of a direct communication session between the first UAV and the second UAV; and directly communicate, with the second UAV via the direct communication session, coordination information to coordinate real-time movement of the first UAV or the second UAV to address the potential occurrence of the situation.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
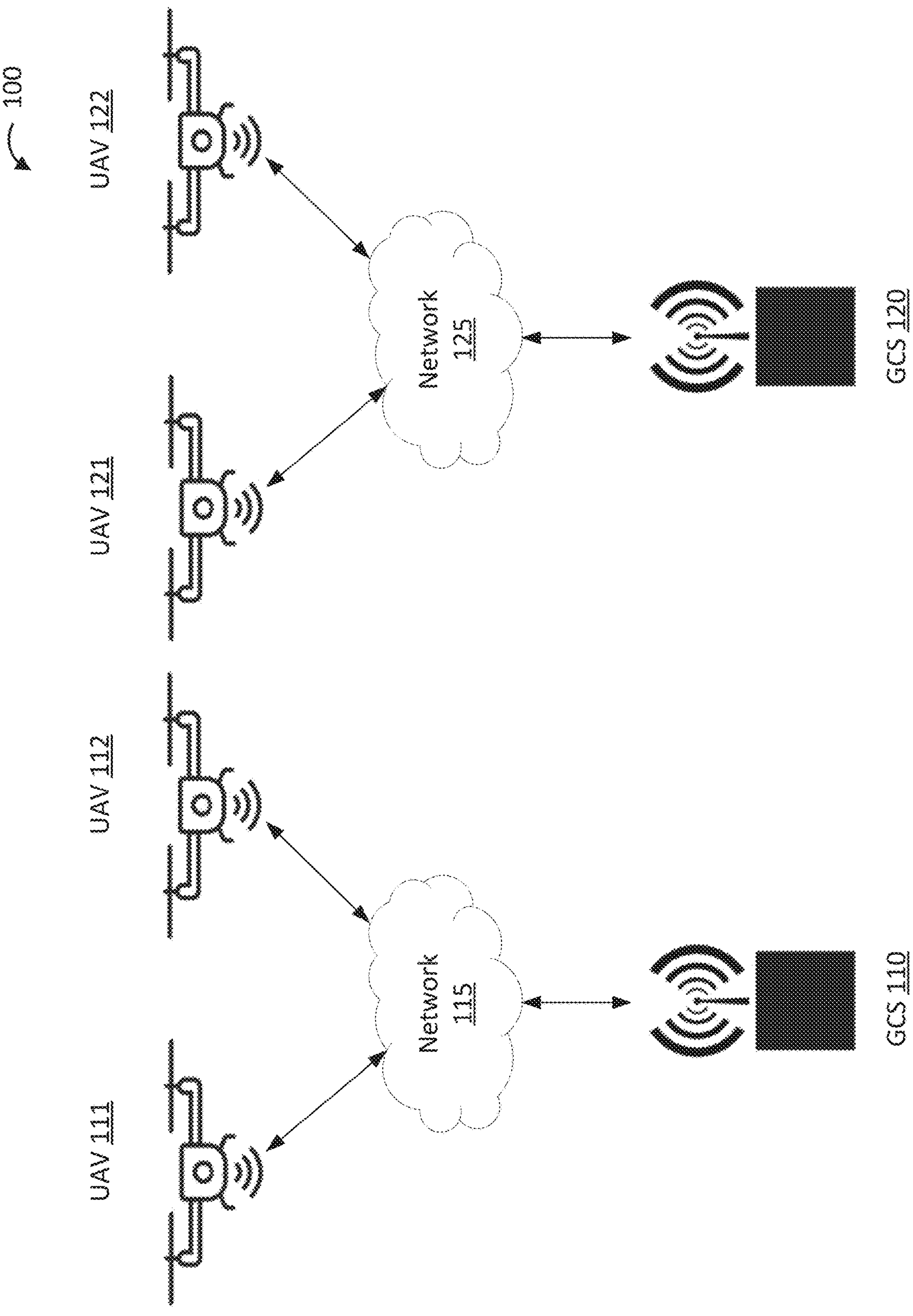

FIG. 1 is an illustration of an example system associated with optimized communication among UAVs, according to various aspects of the present disclosure.

Figure 2:
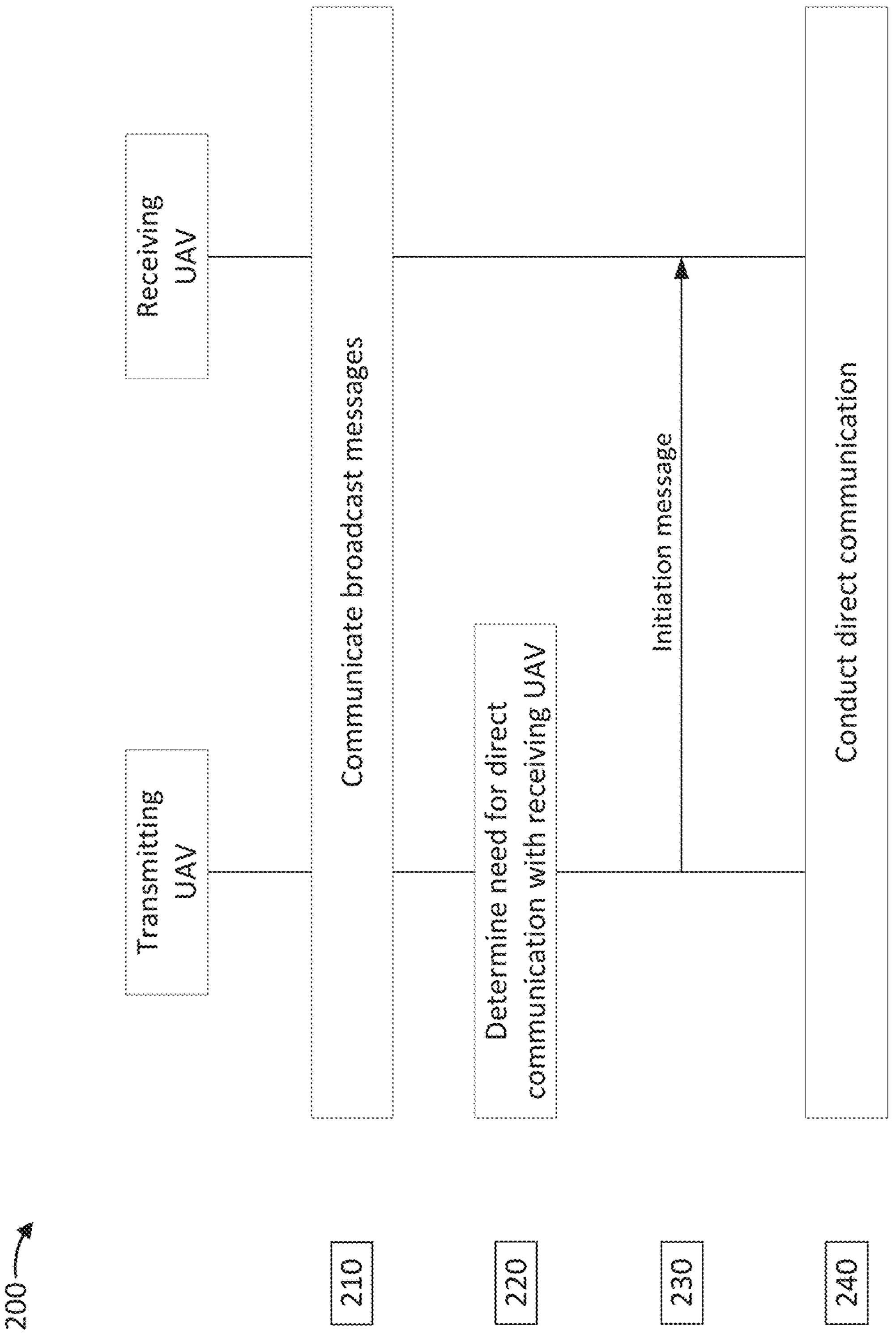

FIG. 2 is an illustration of an example flow associated with optimized communication among UAVs, according to various aspects of the present disclosure.

FIGS. 3A-3D are illustrations of example situations associated with optimized communication among UAVs, according to various aspects of the present disclosure.

Figure 4:
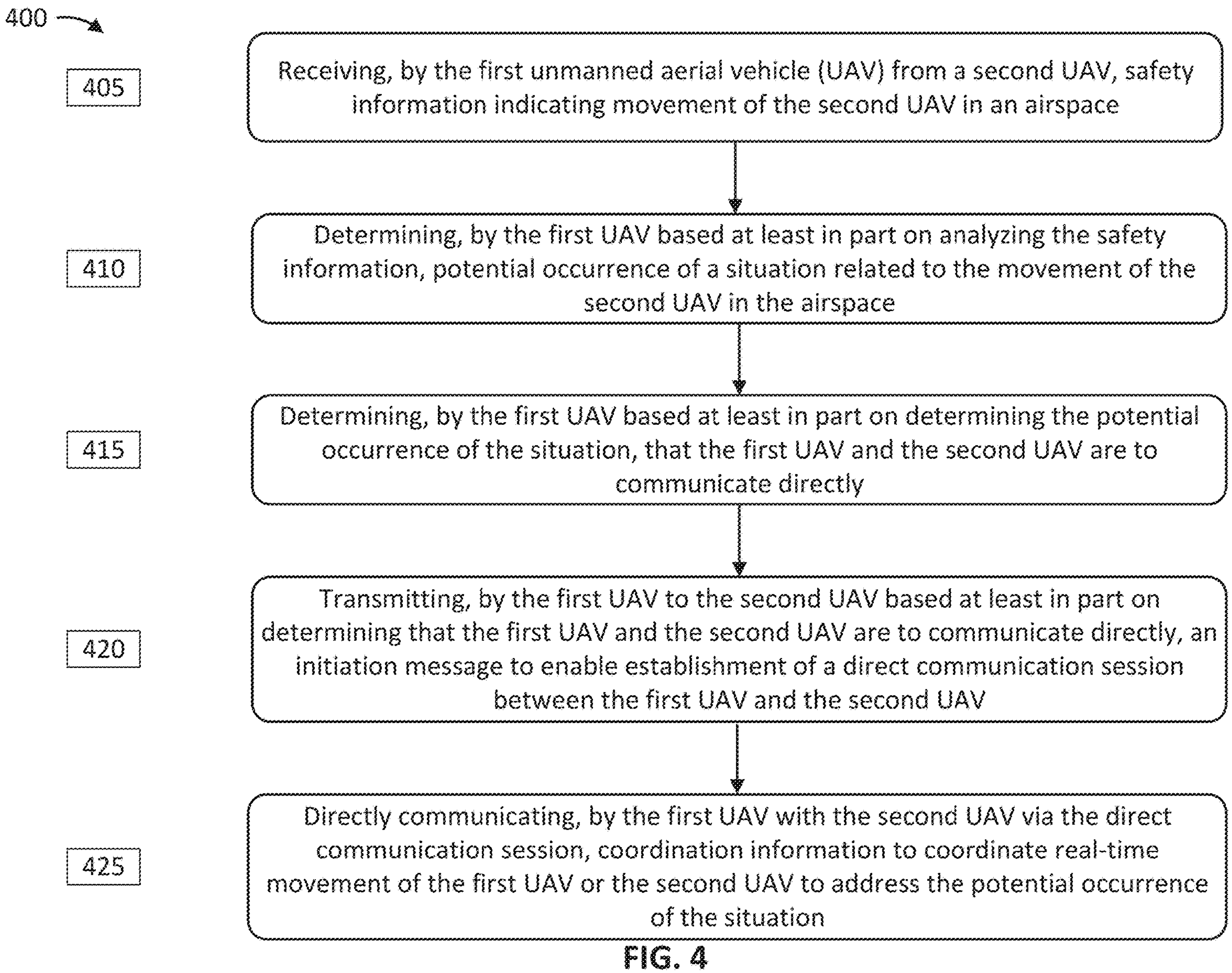

FIG. 4 is an illustration of example process associated with optimized communication among UAVs, according to various aspects of the present disclosure.

Figure 5:
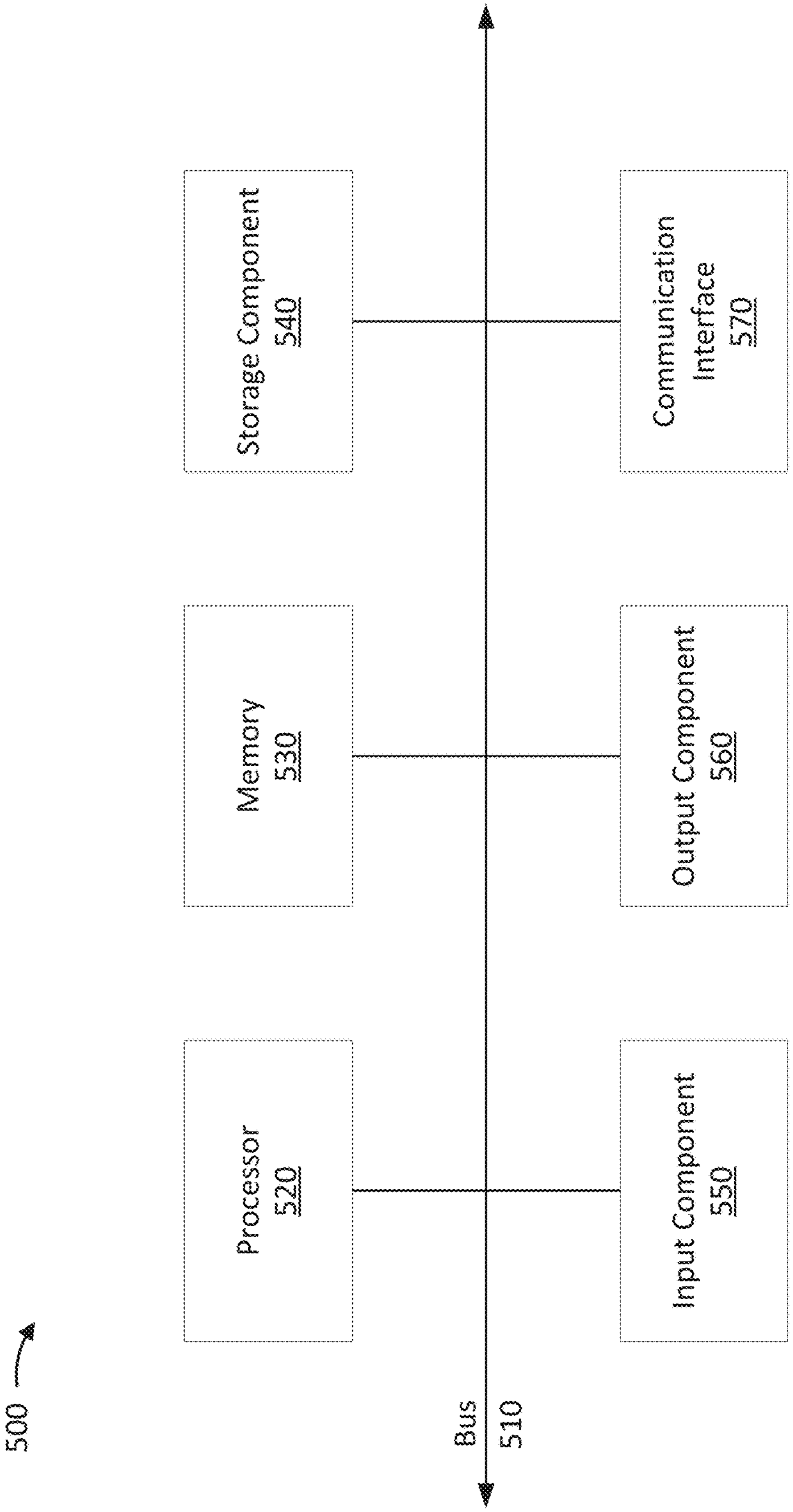

FIG. 5 is an illustration of example devices associated with optimized communication among UAVs, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example system 100 associated with optimized communication among UAVs, according to various aspects of the present disclosure. The system 100 includes first UAVs 111, 112 communicating with an associated first ground control station (GCS) 110, and second UAVs 121, 122 communicating with an associated second ground control station (GCS) 120. Although only four UAVs and two GCSs are depicted in FIG. 1, the present disclosure contemplates any amount of GCSs being associated with any amount of UAVs.

In some aspects, the first UAVs 111, 112 may communicate with the first GCS 110 via a first network 115 and the second UAVs 121, 122 may communicate with the second GCS 120 via a first network 125. The first network 115 and the second network 125 may be a single network or separate networks, and may include a radio frequency (RF) network utilizing a protocol such as, for example, a MAVLink protocol. In some aspects, the GCSs 110, 120 may respectively monitor and assist UAVs 111, 112, 121, 122 during flight.

In some aspects, each of the UAVs 111, 112, 121, 122 may also directly communicate with each other using one or more of various long-range communication technologies such as, for example, Worldwide Interoperability for Microwave Access (WIMAX), cellular, satellite, infrared, RF, Wi-Fi, and/or private session communication. As discussed in further detail below, the UAVs may communicate using broadcast messages and/or direct messages.

A UAV (e.g., UAV 111, 112, 121, 122) may be physically equipped with a fixed wing structure (like an airplane) and/or a rotary wing structure (like a helicopter). The UAV may include a processor communicatively coupled to an electronic memory and transceiver circuitry. The processor and/or memory may be pre-programmed with flight plans and may operate electronics associated with navigation, control, and communication in accordance with the flight plans. Such electronics may include one or more rotors, global positioning system (GPS) receivers, gyroscopes, accelerometers, and sensors (e.g., lidar, cameras, etc.) for mapping and sensing. The processor may manage the UAV's flight and operational behavior, ensuring stability, responsiveness, and safety, and may communicate relevant information regarding the same to an associated GCS.

A GCS (e.g., GCS 110, 120) may include its own processor coupled to an electronic memory and transceiver circuitry. The GCS may configure the UAV with flight plans. In some aspects, configuring the UAV with flight plans may include programming and/or storing the flight plans in the processor and/or the electronic memory of the UAV. The GCS may also include an interface (e.g., screen, input/output units, etc.) for a human operator to monitor and/or communicate with the UAV during flight operation. At any time, the GCS may take over operations of the UAV. In some aspects, the GCS may be in constant communication with the UAV via communication links such as, for example, RF links, satellite links, and/or cellular links. The GCS may receive and log data such as, for example, flight data, sensor data, communication data, and performance data associated with the UAV. In some aspects, the GCS may analyze logged data to determine issues and/or refine or modify operational procedures associated with the flight plan.

One or more devices (e.g., a UAV, a GCS, etc.) included in example 100 shown in FIG. 1 may further be associated with one or more components such as a controller/processor, a memory, a communication interface, or a combination thereof (e.g., FIG. 6). In some aspects, the one or more components may be separate and distinct from each other. Alternatively, in some aspects, the one or more components may be combined with another one of the one or more components. In some aspects, the one or more components may be local with respect to another one of the one or more components. Alternatively, in some aspects, the one or more components may be located remotely with respect to another one of the one or more components. Additionally, or alternatively, the one or more components may be implemented at least in part as software stored in a memory for execution by a processor. For example, a component (or a portion of a component) may be implemented as instructions or code stored in a non-transitory computer-readable medium and executable by a controller or a processor to perform the functions or operations of the component. Additionally, the one or more components may be configured to perform one or more functions described as being performed by another one of the one or more components.

As indicated above, FIG. 1 is provided as an example. Other examples may differ from what is described with regard to FIG. 1.

UAVs may have to follow certain rules and procedures during flight operation. Such rules and procedures may include, for example, rules associated with registering the UAVs with an appropriate aviation authority, following designated flight paths and staying within approved airspace, flying below a threshold height from the ground (e.g., 400 feet), and maintaining safe distance from buildings and physical structures, people, and also other UAVs (or aircrafts).

To maintain the safe distance from other UAVs in a shared airspace, a transmitting UAV may broadcast safety information that is to be received by other UAVs (e.g., receiving UAVs) flying within a threshold distance from the transmitting UAV. The safety information may include, for example, identification information to identify the transmitting UAV and a first GCS associated with the transmitting UAV, communication information (e.g., internet protocol (IP) address and/or a first port, unique address (e.g. MAC address), network identifier, etc.) associated with the transmitting UAV to be utilized by another UAV (e.g., receiving UAV) to communicate with the transmitting UAV, a location of the transmitting UAV, a speed of the transmitting UAV, a direction of travel of the transmitting UAV, an altitude of the transmitting UAV, a priority assigned to the transmitting UAV, and a timestamp to provide a time reference utilized by the transmitting UAV.

The safety information may be received by a receiving UAV that is flying within the threshold distance (e.g., 1 mile, 2 miles, 5 miles, etc.). Upon receiving the safety information, the receiving UAV may transmit (at least a portion of) the safety information to a second GCS associated with the receiving UAV. The second GCS may be the same as or different from the first GSC associated with the transmitting UAV. A human operator interfacing with the second GCS may interpret the safety information. Further, based at least in part on interpreting the safety information, the human operator may determine that the transmitting UAV is moving along a path that intersects a path being followed by a receiving UAV. In this case, the human operator may determine corrective action to avoid a potential collision between the transmitting UAV and the receiving UAV. In an example, the human operator may determine that the receiving UAV is to alter its flight operation to, for example, avoid the potential collision. In this case, the human operator may utilize the second GCS to transmit instructions that alter the flight plan to the receiving UAV to assist with avoiding the potential collision. In some cases, when the transmitting UAV transmits the safety information to the first GCS, a similar process may take place with respect to the transmitting UAV and the first GCS to assist the transmitting UAV in avoiding the potential collision.

It is time consuming for the safety information to be transmitted to a GCS (e.g., first GCS and/or second GCS), the safety information to be interpreted by the human operator, the human operator to determine the corrective action, the human operator to transmit the corrective action to the UAV (e.g., transmitting UAV and/or receiving (UAV), and for the UAV to implement the corrective action. These time consuming actions introduce a delay in the UAV implementing the corrective action. Additionally, the process may introduce errors due to involvement of a human operator. The introduction of the delay and/or errors introduced due to human involvement may result in the UAV's failure to avoid the potential collision.

Further, simply receiving the broadcasted safety information may not always be sufficient to prevent collisions due to the inherent delays and changes in real-time flight dynamics. In an example, when the receiving UAV receives the safety information, the receiving UAV may be at a considerable distance from a location of the potential collision. During the time it takes for the receiving UAV to process and react to this broadcast, positions and/or velocities of both the receiving UAV and the transmitting UAV may have changed. This results in a temporal gap such that what was once a safe distance can quickly close, making it challenging for the transmitting UAV and/or the receiving UAV to adjust in time to avoid the potential collision. In another example, sometimes, errors may be included in the safety information due to the dynamic conditions associated with flying. In an instance, the safety information may inaccurately indicate the location of the transmitting UAV and/or the speed of the transmitting UAV and/or the altitude of the transmitting UAV, or the like. In another instance, errors associated with wireless communications such as, signal interference, signal attenuation, noise, packet loss, etc., may impact reliability and accuracy of the communication. As a result, sometimes, the broadcasted information may not be adequately received. And when received, the broadcasted information may be incomplete and/or outdated. In this case, the corrective action may be taken based at least in part on the incomplete or outdated information, thereby increasing a risk of the potential collision taking place despite of broadcasting the safety information. As such, while the broadcasting the safety information is useful, it may not always be a foolproof measure for avoiding potential collisions.

Various aspects of systems, methods, and techniques discussed in the present disclosure enable optimized communication among UAVs. In some aspects, the present disclosure contemplates, after broadcasting of safety information, initiation and establishment of the real time direct communication between UAVs (e.g., a transmitting UAV and a receiving UAV) without involvement of a human or a GCS. In some aspects, the transmitting UAV and the receiving UAV may exchange broadcasted safety information (e.g., the receiving UAV receives broadcasted safety information from the transmitting UAV and the transmitting UAV receives broadcasted safety information from the receiving UAV). As a result, the transmitting UAV may be aware of communication information associated with the receiving UAV and the receiving UAV may be aware of communication information associated with the transmitting UAV. During flight operation, and based at least in part on the safety information received from the receiving UAV and/or based at least in part on utilization of on-board sensors, the transmitting UAV may determine potential occurrence of a situation that calls for direct communication between the transmitting UAV and the receiving UAV. In one example situation, the transmitting UAV may determine that a potential collision may occur between the transmitting UAV and the receiving UAV. In another example situation, the transmitting UAV may determine that the transmitting UAV and/or the receiving UAV may encounter a hazard (e.g., ominous weather, non-conforming or unknown aircrafts or vehicles (manned or unmanned), and/or non-conforming objects). Additional example situations are discussed below with respect to FIGS. 3A-3D. In these situations, the transmitting UAV may determine that the transmitting UAV is to initiate direct communication with the receiving UAV. In one example, the transmitting UAV may utilize the communication information associated with the receiving UAV to initiate the direct communication with the receiving UAV. In some aspects, the transmitting UAV and/or the receiving UAV may establish a communication session between the transmitting UAV and the receiving UAV to conduct the direct communication. The direct communication may enable the transmitting UAV and the receiving UAV to coordinate in real-time a corrective action to avoid the potential collision or hazard. In an example, during the direct communication, the transmitting UAV and the receiving UAV may exchange, in real time, coordination information, which may include information such as respective current locations of the UAVs, respective current and/or intended speeds of the UAVs, respective current and/or intended directions of travel of the UAVs, respective current and/or intended altitudes of the UAVs, respective current and/or intended movements of the UAVs, or a combination thereof. In another example, during the direct communication, the transmitting UAV and the receiving UAV may exchange coordination information, which may include information regarding dynamic conditions associated with an observed hazard. Based at least in part on analyzing the exchanged coordination information, the transmitting UAV and the receiving UAV may directly communicate to agree on and implement the corrective action to be taken by the transmitting UAV and/or the receiving UAV to avoid the potential collision or hazard.

In this way, by enabling real-time direct communication between the transmitting UAV and the receiving UAV, issues such as temporal gaps and incomplete and/or outdated broadcasted safety information may be obviated, and the transmitting UAV and the receiving UAV may avoid the potential collision or hazard. Further, this may be accomplished by the transmitting UAV and the receiving UAV autonomously without involvement of a GCS or a human operator. As a result, the present disclosure may mitigate effects of UAVs encountering collisions and/or hazards, thereby enabling efficient utilization of UAV resources and/or GCS resources (e.g., management resources, memory resources, computational/processing resources, power consumption resources, system bandwidth, network resources, etc.) while avoiding unnecessary utilization of such resources to address issues faced after UAVs collide or meet with hazards.

In some aspects, a UAV may receive, from a second UAV, safety information indicating movement of the second UAV in the airspace; determine, based at least in part on analyzing the safety information, potential occurrence of a situation related to the movement of the second UAV in the airspace; determine, based at least in part on determining the potential occurrence of the situation, that the first UAV and the second UAV are to communicate directly; transmit, to the second UAV based at least in part on determining that the first UAV and the second UAV are to communicate directly, an initiation message to enable establishment of a direct communication session between the first UAV and the second UAV; and directly communicate, with the second UAV via the direct communication session, coordination information to coordinate real-time movement of the first UAV or the second UAV to address the potential occurrence of the situation.

FIG. 2 is an illustration of an example flow 200 associated with optimized communication among UAVs, according to various aspects of the present disclosure. The example flow 200 may include a transmitting UAV (e.g., UAV 111, 112, 121, 122) and one or more receiving UAVs (e.g., 111, 112, 121, 122). As discussed previously, the optimized communication among UAVs may include enabling the UAVs to directly communicate coordination information in real time without involvement of a GCS or a human operator. In some aspects, the transmitting UAV and/or the receiving UAV may utilize respective processors and/or memories to execute the example flow 200. In some aspects, the optimized communication among UAVs may occur during flight operation. Although FIG. 2 depicts one transmitting UAV and one receiving UAV, the present disclosure contemplates that the optimized communication can occur between any number of transmitting UAVs and any number of receiving UAVs.

In some aspects, the transmitting UAV and the receiving UAV may be operating based at least in part on respective flight plans, which may be respectively pre-programmed by a first GCS (e.g., GCS 110) associated with the transmitting UAV and a second GCS (e.g., GCS 120) associated with the receiving UAV. During flight operation, as shown by reference numeral 210, the transmitting UAV and the receiving UAV may communicate (e.g., transmit and/or receive) broadcast messages including safety information. In an example, the transmitting UAV may transmit a first broadcast message including first safety information that is received by the receiving UAV, and the receiving UAV may transmit a second broadcast message including second safety information that is received by the transmitting UAV.

The first safety information may include, for example, first identification information to identify the transmitting UAV and the first GCS associated with the transmitting UAV, first communication information (e.g., first internet protocol (IP) address and/or a first port, first unique address (e.g. first MAC address), first network identifier, etc.) associated with the transmitting UAV to be utilized by another UAV (e.g., receiving UAV) to communicate with the transmitting UAV, a first location of the transmitting UAV, a first speed of the transmitting UAV, a first direction of travel of the transmitting UAV, a first altitude of the transmitting UAV, a first priority assigned to the transmitting UAV, and a first timestamp to provide a time reference utilized by the transmitting UAV. Similarly, the second safety information may include, for example, second identification information to identify the receiving UAV and the second GCS associated with the receiving UAV, second communication information (e.g., second internet protocol (IP) address and/or a second port, second unique address (e.g. second MAC address), second network identifier, etc.) associated with the receiving UAV to be utilized by another UAV (e.g., transmitting UAV) to communicate with the receiving UAV, a second location of the receiving UAV, a second speed of the receiving UAV, a second direction of travel of the receiving UAV, a second altitude of the receiving UAV, a second priority assigned to the receiving UAV, and a second timestamp to provide a time reference utilized by the receiving UAV. In some aspects, the transmitting UAV and the receiving UAV may communicate the broadcast messages periodically (e.g., every 60 seconds, every 180, every 500 seconds, etc.) at a predetermined frequency (e.g., 1 KHz).

Based at least in part on receiving the second broadcast message, as shown by reference numeral 220, the transmitting UAV may determine a need for direct communication with the receiving UAV. In some aspects, the transmitting UAV may determine the need for direct communication based at least in part on analyzing the second safety information included in the second broadcast message. The transmitting UAV may determine the need for direct communication in different situations.

Figure 3A:
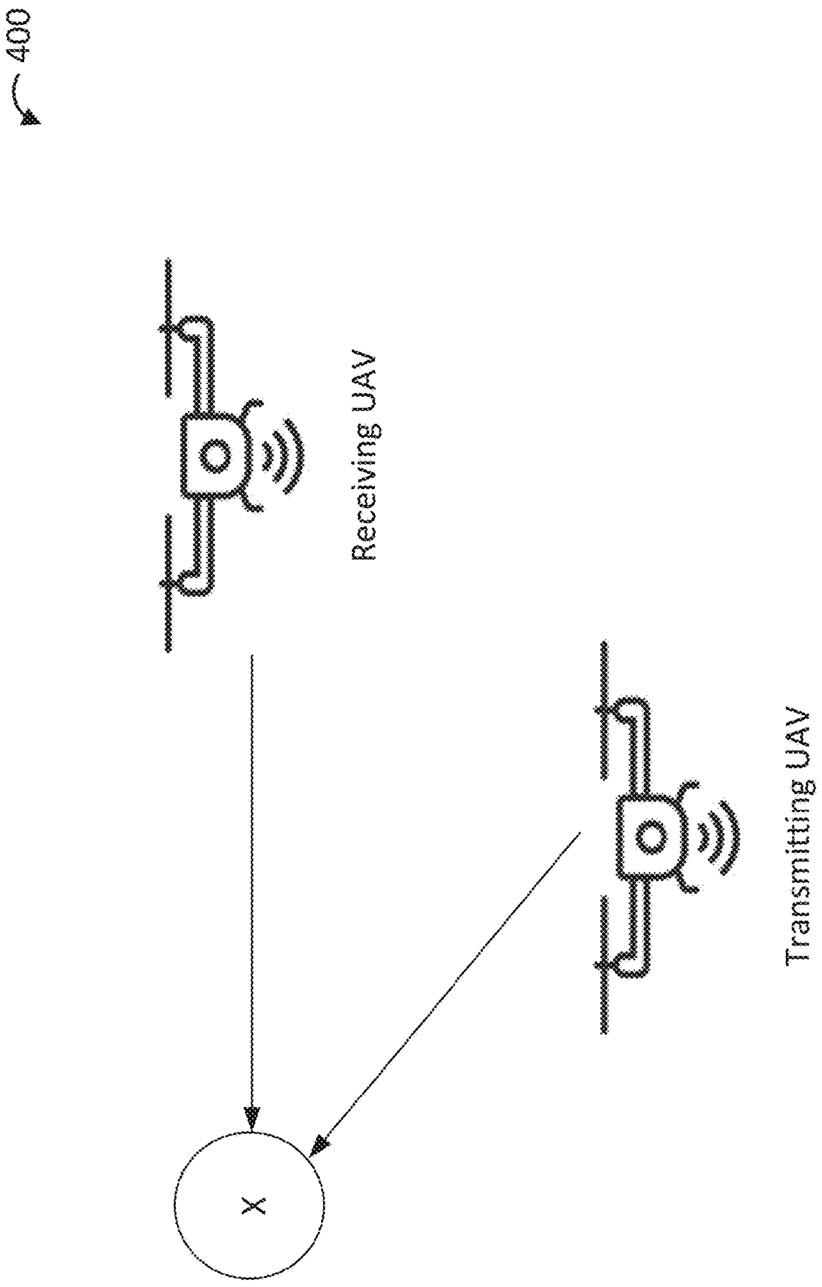

In some aspects, the transmitting UAV may determine the need for direct communication based at least in part on analyzing the second safety information and determining potential occurrence of a situation that the transmitting UAV moving in a path that intersects a path being followed by the receiving UAV such that a potential collision may occur at location X. Additionally, or alternatively, to determine the need for direct communication, the transmitting UAV may utilize onboard sensors (e.g., lidar, cameras, etc.) to sense characteristics of a surrounding and determine that the receiving UAV is operating within a threshold distance from the transmitting UAV. In this case, based at least in part on receiving the safety information from the receiving UAV, the transmitting UAV may utilize the onboard sensors to constantly track movement of the receiving UAV within the threshold distance. Based at least in part on the sensing and/or tracking, as shown in FIG. 3A, the transmitting UAV may also determine that the transmitting UAV and the receiving UAV are moving such that a potential collision may occur at location X.

Based at least in part on determining the potential occurrence of this situation, the transmitting UAV may determine that the transmitting UAV and the receiving UAV are to communicate directly to avoid the potential collision. Further, the transmitting UAV may determine that the transmitting UAV is to initiate direct communication between the transmitting UAV and the receiving UAV. The determination regarding initiation of the direct communication maybe based at least in part on priorities assigned to the transmitting UAV and the receiving UAV. In an example, it may be established that a UAV having a higher priority is to initiate the direct communication. As a result, the transmitting UAV may compare the first priority assigned to the transmitting UAV with the second priority assigned to the receiving UAV. When the transmitting UAV determines that the first priority is higher than the second priority, the transmitting UAV may determine that the transmitting UAV is to initiate the direct communication. Alternatively, when the transmitting UAV determines that the second priority is higher than the first priority, the transmitting UAV may determine that the receiving UAV is to initiate the direct communication. In this case, the transmitting UAV may await the receiving UAV's indication to initiate the direct communication.

Based at least in part on determining that the transmitting UAV is to initiate the direct communication, as shown by reference numeral 230, the transmitting UAV may transmit an initiation message to the receiving UAV to initiate the direct communication. In some aspects, the transmitting UAV may utilize the second communication information associated with the receiving UAV to transmit the initiation message to the receiving UAV. The transmitting UAV may utilize one or more of various wireless communication schemes (e.g., RF communication, cellular communication, Wi-Fi communication, Bluetooth communication, satellite communication, WiMAX communication, or the like) to transmit the initiation message to the receiving UAV. The one or more of such wireless communication schemes may also be utilized to conduct the direct communication.

The initiation message may inform the receiving UAV of the determination that the transmitting UAV and the receiving UAV are moving such that a potential collision may occur at location X. In some aspects, the initiation message may indicate the location X and an amount of time within which the potential collision may occur. The transmitting UAV may calculate this information based at least in part on determining a speed of the receiving UAV, the speed being determined based at least in part on tracking the receiving UAV.

Further, the initiation message may include a request to establish a direct communication session between the transmitting UAV and the receiving UAV to facilitate reliable exchange of coordination information.

Based at least in part on the transmitting UAV transmitting the initiation message and the receiving UAV receiving the initiation message, as shown by reference numeral 240, the transmitting UAV and the receiving UAV may establish the direct communication session to conduct reliable direct communication. For instance, based at least in part on receiving the initiation message, the receiving UAV may transmit a response message to respond to the initiation message to enable establishment of the direct communication session. In some aspects, the receiving UAV may utilize the first communication information associated with the transmitting UAV to transmit the response message. The transmitting UAV and the receiving UAV may negotiate session information that indicates protocols and/or parameters to be utilized by the transmitting UAV and the receiving UAV to communicate during the direct communication session. In an example, the session information may indicate checksum and/or hashtag protocols and/or parameters to be utilized by the transmitting UAV and the receiving UAV to ensure that the communicated messages are not tampered with during transit. In another example, the session information may indicate encryption and decryption protocols that are parameters to be utilized by the transmitting UAV and the receiving UAV to securely communicate messages during the direct communication. In this way, based at least in part on communication of the initiation message and the response message, the direct communication session may be established between the transmitting UAV and the receiving UAV.

During the direct communication session, the transmitting UAV and the receiving UAV may directly and continuously (e.g., every 100 ms, every 250 ms, every 500 ms, etc.) communicate coordination information to coordinate avoidance of the potential collision. In an example, based at least in part on receiving the initiation message, the receiving UAV may indicate that the receiving UAV is to yield to the transmitting UAV by, for instance, slowing down the speed of the receiving UAV, or increasing the speed of the receiving UAV, or changing a direction of movement of the receiving UAV, or a combination thereof, such that the potential collision may be avoided. In another example, the receiving UAV may request the transmitting UAV to yield to the receiving UAV. In this case, the transmitting UAV may yield to the receiving UAV by, for example, slowing down the speed of the transmitting UAV, or increasing the speed of the transmitting UAV, or changing a direction of movement of the transmitting UAV, or a combination thereof, such that the potential collision may be avoided. In yet another example, both the transmitting UAV and the receiving UAV may adjust their respective speeds and/or direction of movement to avoid the potential collision. In this way, by communicating coordination information, the transmitting UAV and the receiving UAV may avoid the collision.

Figure 3B:
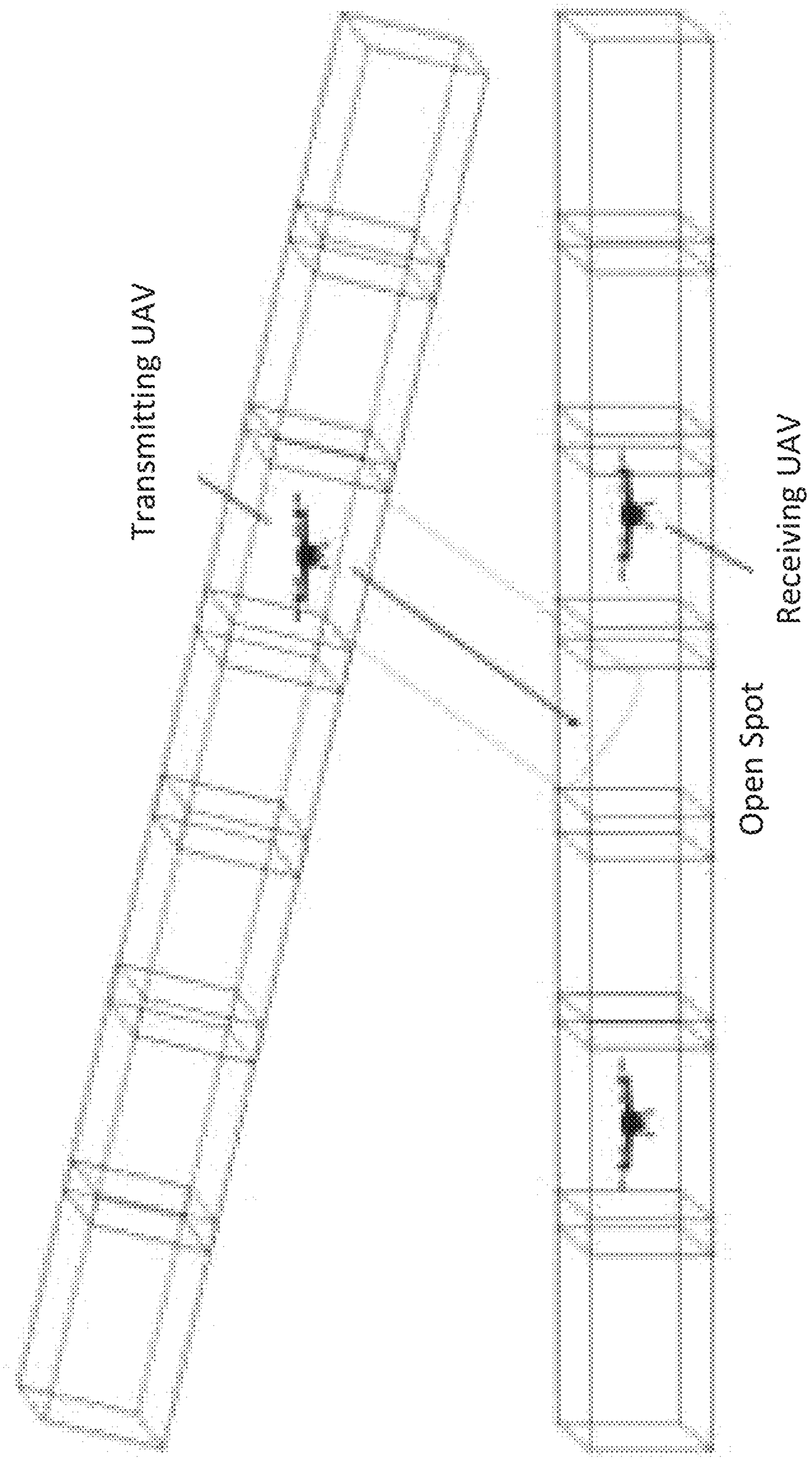

In some aspects, the transmitting UAV may determine the need for direct communication based at least in part on analyzing the second safety information and determining potential occurrence of a situation that the transmitting UAV is to merge along a given path being followed by the receiving UAV. To determine the need for direct communication and/or based at least in part on receiving the safety information from the receiving UAV, during flight operation, the transmitting UAV may utilize the onboard sensors to determine a position of the receiving UAV along the given path. Further, the transmitting UAV may utilize the onboard sensors to constantly track movement of the receiving UAV. Based at least in part on the sensing and/or tracking, as shown in FIG. 3B, the transmitting UAV may also determine an open spot in the given path where the transmitting UAV is to merge.

Based at least in part on determining the potential occurrence of this situation, the transmitting UAV may determine that the transmitting UAV and the receiving UAV are to communicate directly to enable real-time traffic management between the transmitting UAV and the receiving UAV. Further, the transmitting UAV may determine that the transmitting UAV is to initiate direct communication between the transmitting UAV and the receiving UAV. The determination regarding initiation of the direct communication maybe based at least in part on priorities assigned to the transmitting UAV and the receiving UAV, as discussed elsewhere herein. Based at least in part on determining that the transmitting UAV is to initiate the direct communication, the transmitting UAV may transmit the initiation message to the receiving UAV to initiate the direct communication, as discussed elsewhere herein.

The initiation message may inform the receiving UAV of the determination that the transmitting UAV is to merge along the given path being followed by the receiving UAV. For instance, the initiation message may request the receiving UAV that is near the open spot (e.g., receiving UAV moving into the open spot) to yield and allow the transmitting UAV to move into the open spot. In some aspects, the initiation message may indicate a location of the open spot and other information (e.g., timing information (e.g., an estimated time of merger, an amount of time required to merge, etc.)) to negotiate the merger. The transmitting UAV may calculate this information based at least in part on determining a speed of the one or more receiving UAVs, the speed being determined based at least in part on tracking movement of the one or more receiving UAVs along the given path.

Based at least in part on the transmitting UAV transmitting the initiation message and the receiving UAV receiving the initiation message, the transmitting UAV and the receiving UAV may establish a direct communication session to conduct reliable direct communication, as discussed elsewhere herein.

During the direct communication session, the transmitting UAV and the receiving UAV may directly continuously (e.g., every 100 ms, every 250 ms, every 500 ms, etc.) communicate coordination information to negotiate the merger. In an example, based at least in part on receiving the initiation message, the receiving UAV may indicate that the receiving UAV may yield to the transmitting UAV by, for example, suspending or slowing down its movement towards the open slot such that the transmitting UAV may enter the spot and merge in the given path. In some aspects, the receiving UAV may suspend its movement by hovering in its current location. In this case, the transmitting UAV may merge by entering the open spot. Further, the transmitting UAV may continue along the path at the speed determined based on the tracking of the receiving UAV. In some aspects, the transmitting UAV may communicate with the receiving UAV to confirm parameters (e.g., speed, direction of movement, distance to maintain between UAVs, etc.) associated with moving along the given path.

In some aspects, UAVs moving along the given path may be required to maintain a threshold amount of distance (e.g., number of spots) therebetween. For instance, a UAV moving along the given path may be required to maintain a distance of, for example, two spots between a preceding UAV and a following UAV (see FIG. 3B). In this case, when the receiving UAV suspends or slows down its movement towards the spot to allow the transmitting UAV to merge, the receiving UAV may transmit a message requesting the following UAV to also suspend or slow down its movement along the path to maintain the distance. In this way, the transmitting UAV may merge with the receiving UAV and move along the given path.

Figure 3C:
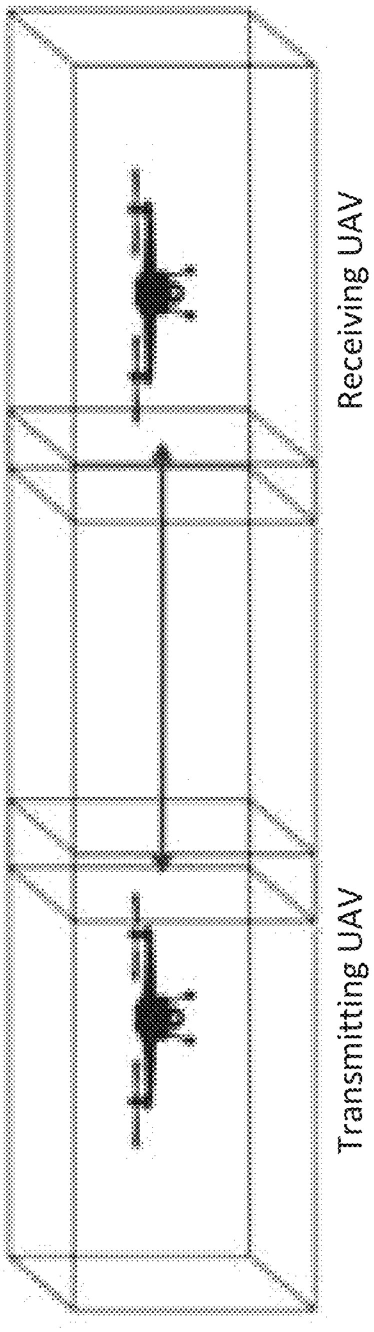

In some aspects, the transmitting UAV may determine the need for direct communication based at least in part on analyzing the second safety information and determining potential occurrence of a situation that a minimum distance is to be maintained between the transmitting UAV and other UAVs. To determine the need for direct communication and/or based at least in part on receiving the safety information from the receiving UAV, during flight operation, the transmitting UAV may utilize the onboard sensors to determine that one or more UAVs (e.g., receiving UAV) within the threshold distance from the transmitting UAV is either stationary or moving along a given path as the transmitting UAV. Further, the transmitting UAV may utilize the onboard sensors to constantly track movement of the one or more receiving UAVs. Based at least in part on the sensing and/or tracking, as shown in FIG. 3C, the transmitting UAV may determine that a minimum distance is to be maintained between the transmitting UAV and a receiving UAV.

Based at least in part on determining the potential occurrence of this situation, the transmitting UAV may determine that the transmitting UAV and the receiving UAV are to communicate directly to enable real-time traffic conflict management between the transmitting UAV and the receiving UAV. Further, the transmitting UAV may determine that the transmitting UAV is to initiate direct communication between the transmitting UAV and the receiving UAV. The determination regarding initiation of the direct communication maybe based at least in part on priorities assigned to the transmitting UAV and the receiving UAV, as discussed elsewhere herein. Based at least in part on determining that the transmitting UAV is to initiate the direct communication, the transmitting UAV may transmit the initiation message to the receiving UAV to initiate the direct communication, as discussed elsewhere herein.

The initiation message may request the receiving UAV to maintain a minimum distance between the transmitting UAV and the receiving UAV. For instance, the initiation message may indicate an amount of the minimum distance (e.g., 10 feet, 15 feet, etc.). In another example, the initiation message may indicate an amount of open spots (e.g., 1 spot, 2 spots, etc.). In some aspects, the minimum distance (in all directions) may be part of the pre-programmed flight plan to be followed by the transmitting UAV. In some aspects, as shown in FIG. 3C, the minimum distance may be a parameter associated with a given path followed by the transmitting UAV and the (preceding and/or following) receiving UAV. In some aspects, the minimum distance may change during flight operation of the UAVs.

The transmitting UAV may utilize the onboard sensors to measure a distance between the transmitting UAV and the receiving UAV, and may compare the measured distance to the minimum distance. The transmitting UAV may then selectively request the receiving UAV to maintain the minimum distance based at least in part on a result of the comparison. For instance, when the transmitting UAV determines that the measured distance is smaller than the minimum distance, the transmitting UAV may include the request in the initiation message. Alternatively, when the transmitting UAV determines that the measured distance is greater than or equal to the minimum distance, the transmitting UAV may refrain from including the request in the initiation message.

Based at least in part on the transmitting UAV transmitting the initiation message and the receiving UAV receiving the initiation message, the transmitting UAV and the receiving UAV may establish a direct communication session to conduct reliable direct communication, as discussed elsewhere herein.

During the direct communication session, the transmitting UAV and the receiving UAV may directly communicate coordination information to negotiate maintenance of the minimum distance. In an example, based at least in part on receiving the initiation message, the receiving UAV may indicate that the receiving UAV has received the initiation message and that, to maintain the minimum distance, the receiving UAV is, for example, suspending, speeding up, or slowing down its current movement. Alternatively, the receiving UAV may indicate that the receiving UAV has received the initiation message and may request the transmitting UAV to maintain the minimum distance by, for example, suspending, speeding up, or slowing down current movement of the transmitting UAV. In some aspects, a UAV (e.g., transmitting UAV or receiving UAV) may suspend its movement by hovering in its current location.

In some aspects, when the transmitting UAV and/or the receiving UAV suspends, speeds up, or slows down its movement to maintain the minimum distance, the transmitting UAV and/or the receiving UAV may transmit a message requesting at least another UAV to also suspend, speed up, or slow down its movement to maintain a respective minimum distance between (i) the transmitting UAV and/or the receiving UAV and (ii) the other UAV. In this way, the transmitting UAV and the receiving UAV may maintain the minimum distance therebetween and other UAVs.

In some aspects, the transmitting UAV may determine the need for direct communication based at least in part on analyzing the second safety information and determining and/or detecting potential occurrence of a situation associated with presence of features in the airspace. Such features may include types of hazards such as, for example, no-fly zones, ominous weather, non-conforming or unknown aircrafts or vehicles (manned or unmanned), and/or non-conforming objects. A no-fly zone may include a designated area where UAVs are prohibited from entering due to security, safety, or regulatory reasons. Ominous weather may include severe conditions including a windstorm, hail storm, tornado, snowstorm, heavy winds, heavy rainfall, or a combination thereof. Non-conforming or unknown aircrafts may include aircrafts failing to follow regulations associated with occupying the airspace. Non-confirming objects may include birds, etc.

Figure 3D:
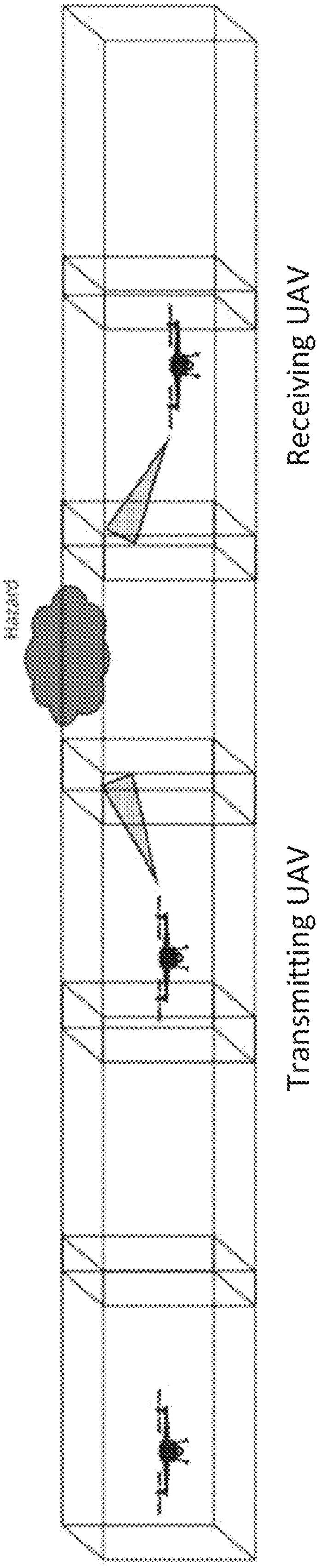

To determine the need for direct communication and/or based at least in part on receiving the safety information from the receiving UAV, during flight operation, the transmitting UAV may utilize the onboard sensors to determine that a hazard has been observed and that the transmitting UAV and/or the receiving UAV is to take evasive action to avoid the hazard. Further, the transmitting UAV may utilize the onboard sensors to constantly track movement of the observed hazard and/or of the receiving UAV. Based at least in part on the sensing and/or tracking, as shown in FIG. 3D, the transmitting UAV may determine that the hazard may adversely affect the transmitting UAV and/or the receiving UAVs occupying the airspace.

Based at least in part on determining the potential occurrence of this situation, the transmitting UAV may determine that the transmitting UAV and the receiving UAV are to communicate directly to enable the transmitting UAV and/or the receiving UAV to take the evasive action. Further, the transmitting UAV may determine that the transmitting UAV is to initiate direct communication between the transmitting UAV and the receiving UAV. The determination regarding initiation of the direct communication maybe based at least in part on priorities assigned to the transmitting UAV and the receiving UAV, as discussed elsewhere herein. Based at least in part on determining that the transmitting UAV is to initiate the direct communication, the transmitting UAV may transmit the initiation message to the receiving UAV to initiate the direct communication, as discussed elsewhere herein.

The initiation message may inform the receiving UAV regarding the observed hazard and may also request the receiving UAV to transmit at least a portion of the state information (e.g., information regarding the observed hazard) in its own broadcasted message to its associated GCS and/or other UAVs. In some aspects, the initiation message may include information regarding the observed hazard such as, for example, a type of the observed hazard, a location and/or direction of movement of the observed hazard, a time associated with observing the hazard, etc. The transmitting UAV may utilize the onboard sensors to measure and/or determine such information regarding the observed hazard.

Based at least in part on the transmitting UAV transmitting the initiation message and the receiving UAV receiving the initiation message, the transmitting UAV and the receiving UAV may establish a direct communication session to conduct reliable direct communication, as discussed elsewhere herein.

During the direct communication session, the transmitting UAV and the receiving UAV may directly communicate coordination information to mitigate effects of being adversely affected by the hazard. In an example, based at least in part on receiving the initiation message, the receiving UAV may take real-time evasive action to avoid the hazard. In another example, the receiving UAV may indicate that the receiving UAV has received the initiation message and/or a type of evasive action being considered and/or being taken by the receiving UAV, which evasive action may include, for example, changing direction, suspending, speeding up, or slowing down its current movement. Such coordination of the evasive action may assist in avoiding an inadvertent collision between the transmitting UAV and the receiving UAV while taking the evasive action.

The transmitting UAV and the receiving UAV may also broadcast, in their respective broadcasted messages, respective evasive actions being considered and/or being taken to avoid the hazard and/or to avoid inadvertent collision with other UAVs. In some aspects, when the transmitting UAV and/or the receiving UAV changes direction, suspends, speeds up, or slows down its movement to take evasive action, the transmitting UAV and/or the receiving UAV may transmit broadcast messages and/or direct messages to one or more other UAVs requesting the one or more other UAVs to also change direction, suspend, speed up, or slow down its movement to avoid the hazard and/or inadvertent collisions among the UAVs. In this way, the transmitting UAV and the receiving UAV may deal with an observed hazard.

In some aspects, in the above examples, the coordination information may also be sent to one or more GCSs by the respective UAVs. For instance, the transmitting UAV may transmit at least a portion of the coordination information to the GCS associated with the transmitting UAV and/or the receiving UAV may transmit at least a portion of the coordination information to the GCS associated with the receiving UAV. In some aspects, the GCS associated with the transmitting UAV and the GCS associated with the receiving UAV may be the same GCS. In some aspects, the GCS associated with the transmitting UAV and the GCS associated with the receiving UAV may be different GCSs.

Although the example flow 200 has been described with respect to actions taken by the transmitting UAV, the present disclosure also contemplates the receiving UAV to be able to take analogous actions.

In some aspects, priorities may be assigned to UAVs as part of flight plans. For instance, UAVs responsible for public safety and security tasks (e.g., emergency response, disaster relief, rescue operations, firefighting operations, etc.) and/or law enforcement tasks (e.g., traffic operations, surveillance, crowd monitoring, suspect tracking, etc.) may be assigned a high priority. UAVs responsible for commercial tasks (e.g., photography, infrastructure inspection and maintenance, delivery and inventory management, entertainment related activities, etc.) may be assigned a medium priority. UAVs responsible for recreational tasks (e.g., hiking activities, sporting activities, social activities, etc.) may be assigned a low priority.

In some aspects, the transmitting UAV and a receiving UAV may employ a checksum to verify data integrity during communication of messages between these UAVs. In an example, the transmitting UAV may compute a checksum by applying a hash function to a message (e.g., initiation message, direct communication messages, etc.), generating a fixed-size numerical value that encapsulates contents of the message. This checksum is transmitted in association with the message to the receiving UAV. Based at least in part on receiving the message and the checksum, the receiving UAV may perform the same hash function on the message to generate a new checksum. The receiving UAV may compare the new checksum with the checksum received in association with the message from the transmitting UAV. When the two numerical values match, it is confirmed that the message was not tampered with during transit. Alternatively, when the two numerical values fail to match, it is confirmed that the message was tampered with during transit. In this case, the receiving UAV may trigger a retransmission protocol to ensure data reliability. An analogous process may be followed to utilize the checksum when the receiving UAV transmits a message to the transmitting UAV. By employing the checksum, the transmitting UAV and the receiving UAV effectively mitigate risk of data corruption due to interference, noise, or malicious tampering.

In some aspects, the transmitting UAV and a receiving UAV may employ a secure communication framework, including encryption and decryption techniques, to safeguard the confidentiality and integrity of messages communicated between these UAVs. In an example, the transmitting UAV may utilize a symmetric or asymmetric encryption algorithm, such as AES (Advanced Encryption Standard) or RSA (Rivest-Shamir-Adleman), to encrypt a message (e.g., initiation message, direct communication messages, etc.). Encrypting the message may involve transforming plaintext data of the message into ciphertext by utilizing an encryption key (e.g., symmetric key or receiving UAV's public key). Based at least in part on receiving the encrypted message, the receiving UAV may apply a corresponding decryption algorithm utilizing a decryption key (e.g., symmetric key or receiving UAV's private key) to revert the ciphertext back into plaintext. This ensures that only an authorized UAV can decipher the message, protecting it from eavesdropping and tampering. Additionally, the implementation of cryptographic protocols, such as TLS (Transport Layer Security), may be used to enhance the security of the communication channel, providing further layers of authentication and integrity checks during the communication. An analogous process may be followed to utilize the encryption and decryption techniques when the receiving UAV transmits a message to the transmitting UAV.

By enabling real-time direct communication between the transmitting UAV and the receiving UAV, issues such as temporal gaps and incomplete and/or outdated broadcasted safety information may be obviated, and the transmitting UAV and the receiving UAV may avoid the potential collision or hazard. Further, this may be accomplished by the transmitting UAV and the receiving UAV autonomously without involvement of a GCS or a human operator. As a result, the present disclosure may mitigate effects of UAVs encountering collisions and/or hazards, thereby enabling efficient utilization of UAV resources and/or GCS resources (e.g., management resources, memory resources, computational/processing resources, power consumption resources, system bandwidth, network resources, etc.) while avoiding unnecessary utilization of such resources to address issues faced after UAVs collide or meet with hazards.

As indicated above, FIGS. 2 and 3 are provided as an example. Other examples may differ from what is described with regard to FIGS. 2 and 3.

FIG. 4 is an illustration of an example process 400 associated with optimized communication among UAVs, according to various aspects of the present disclosure. In some aspects, the process 400 may be performed by respective memories and/or respective processors/controllers (e.g., processor 620) associated with one or more devices (e.g., transmitting or first UAV, receiving or second UAV, etc.) executing respective applications while operating in airspace and/or by a memory and/or a processor/controller (e.g., processor 620) associated with a GCS (e.g., GCS 110, GCS 120, etc.).

As shown by reference numeral 405, process 400 may include a first UAV receiving, by the first unmanned aerial vehicle (UAV) from a second UAV, safety information indicating movement of the second UAV in an airspace. For instance, the first UAV may utilize an associated communication interface (e.g., communication interface 570) with the associated processor/controller to receive, from a second UAV, safety information indicating movement of the second UAV in the airspace, as discussed elsewhere herein.

As shown by reference numeral 410, process 400 may include determining, by the first UAV based at least in part on analyzing the safety information, potential occurrence of a situation related to the movement of the second UAV in the airspace. For instance, the first UAV may utilize the associated processor/controller to determine, based at least in part on analyzing the safety information, potential occurrence of a situation related to the movement of the second UAV in the airspace, as discussed elsewhere herein.

As shown by reference numeral 415, process 400 may include determining, by the first UAV based at least in part on determining the potential occurrence of the situation, that the first UAV and the second UAV are to communicate directly. For instance, the first UAV may utilize the associated processor/controller to determine, based at least in part on determining the potential occurrence of the situation, that the first UAV and the second UAV are to communicate directly, as discussed elsewhere herein.

As shown by reference numeral 420, process 400 may include transmitting, by the first UAV to the second UAV based at least in part on determining that the first UAV and the second UAV are to communicate directly, an initiation message to enable establishment of a direct communication session between the first UAV and the second UAV. For instance, the first UAV may utilize the associated communication interface with the associated processor/controller to transmit, to the second UAV based at least in part on determining that the first UAV and the second UAV are to communicate directly, an initiation message to enable establishment of a direct communication session between the first UAV and the second UAV, as discussed elsewhere herein.

As shown by reference numeral 425, process 400 may include directly communicating (e.g., transmitting and/or receiving), by the first UAV with the second UAV via the direct communication session, coordination information to coordinate real-time movement of the first UAV or the second UAV to address the potential occurrence of the situation. For instance, the first UAV may utilize the associated communication interface with the associated processor/controller to directly communicate, with the second UAV via the direct communication session, coordination information to coordinate real-time movement of the first UAV or the second UAV to address the potential occurrence of the situation, as discussed elsewhere herein.

Process 400 may include additional aspects, such as any single aspect or any combination of aspects described below and/or in connection with one or more other processes described elsewhere herein.

In a first aspect, in process 400, determining the potential occurrence of the situation includes determining that the first UAV is moving in a first path that intersects a second path being followed by the second UAV.

In a second aspect, alone or in combination with the first aspect, in process 400, determining the potential occurrence of the situation includes determining that the first UAV is moving to merge with a path being followed by the second UAV.

In a third aspect, alone or in combination with the first through second aspects, in process 400, determining the potential occurrence of the situation includes determining that a minimum distance is to be maintained between the first UAV and a second UAV in the airspace.

In a fourth aspect, alone or in combination with the first through third aspects, in process 400, determining the potential occurrence of the situation includes determining that the second UAV may meet with a hazard detected by the first UAV in the airspace.

In a fifth aspect, alone or in combination with the first through fourth aspects, in process 400, determining the potential occurrence of the situation includes utilizing an on-board sensor to track real-time movement of the second UAV in the airspace.

In a sixth aspect, alone or in combination with the first through fifth aspects, in process 400, transmitting the initiation message includes utilizing communication information associated with the second UAV, the communication information being received in a broadcast message that is previously received from the second UAV.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of example devices 500, according to various aspects of the present disclosure. In some aspects, the example devices 500 may form part of or implement the systems, devices, environments, infrastructures, components, or the like described elsewhere herein (e.g., FIGS. 1-4) and may be used to perform the example processes described elsewhere herein. The example devices 500 may include a universal bus 510 communicatively coupling a processor 520, a memory 530, a storage component 540, an input component 550, an output component 560, and a communication interface 570.

Bus 510 may include a component that permits communication among multiple components of a device 500. Processor 520 may be implemented in hardware, firmware, and/or a combination of hardware and software. Processor 520 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 520 may include one or more processors capable of being programmed to perform a function. Memory 530 may include a random access memory (RAM), a read only memory (ROM), and/or another type of dynamic or static storage device (e.g., a flash memory, a magnetic memory, and/or an optical memory) that stores information and/or instructions for use by processor 520.

Storage component 540 may store information and/or software related to the operation and use of a device 500. For example, storage component 540 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 550 may include a component that permits a device 500 to receive information, such as via user input (e.g., a touch screen display, a keyboard, a keypad, a mouse, a button, a switch, and/or a microphone). Additionally, or alternatively, input component 550 may include a component for determining location (e.g., a global positioning system (GPS) component) and/or a sensor (e.g., an accelerometer, a gyroscope, an actuator, another type of positional or environmental sensor, and/or the like). Output component 560 may include a component that provides output information from device 500 (via, for example, a display, a speaker, a haptic feedback component, an audio or visual indicator, and/or the like).

Communication interface 570 may include a transceiver-like component (e.g., a transceiver, a separate receiver, a separate transmitter, and/or the like) that enables a device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, and/or the like.

A device 500 may perform one or more processes described elsewhere herein. A device 500 may perform these processes based on processor 520 executing software instructions stored by a non-transitory computer-readable medium, such as memory 530 and/or storage component 540. As used herein, the term "computer-readable medium" may refer to a non-transitory memory device. A memory device may include memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 5 are provided as an example. In practice, a device 500 may include additional components, fewer components, different components, or differently arranged components than those shown in FIG. 5. Additionally, or alternatively, a set of components (e.g., one or more components) of a device 500 may perform one or more functions described as being performed by another set of components of a device 500.

As indicated above, FIG. 5 is provided as an example. Other examples may differ from what is described with regard to FIG. 5.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first unmanned aerial vehicle (UAV) operating in airspace, the first UAV comprising:
- a processor; and
- a memory communicatively coupled to the processor, the processor and the memory being configured to:
  - receive, from a second UAV, safety information indicating movement of the second UAV in the airspace;
  - determine, based at least in part on analyzing the safety information, potential occurrence of a situation related to the movement of the second UAV in the airspace;
  - determine, based at least in part on determining the potential occurrence of the situation, that the first UAV and the second UAV are to communicate directly;
  - transmit, to the second UAV based at least in part on determining that the first UAV and the second UAV are to communicate directly, an initiation message to enable establishment of a direct communication session between the first UAV and the second UAV; and
  - directly communicate, with the second UAV via the direct communication session, coordination information to coordinate real-time movement of the first UAV or the second UAV to address the potential occurrence of the situation.

2. The first UAV of claim 1, wherein, to determine the potential occurrence of the situation, the processor and the memory are configured to determine that the first UAV is moving in a first path that intersects a second path being followed by the second UAV.

3. The first UAV of claim 1, wherein, to determine the potential occurrence of the situation, the processor and the memory are configured to determine that the first UAV is moving to merge with a path being followed by the second UAV.

4. The first UAV of claim 1, wherein, to determine the potential occurrence of the situation, the processor and the memory are configured to determine that a minimum distance is to be maintained between the first UAV and a second UAV in the airspace.

5. The first UAV of claim 1, wherein, to determine the potential occurrence of the situation, the processor and the memory are configured to determine that the second UAV may meet with a hazard detected by the first UAV in the airspace.

6. The first UAV of claim 1, wherein, to determine the potential occurrence of the situation, the processor and the memory are configured to utilize an on-board sensor to track real-time movement of the second UAV in the airspace.

7. The first UAV of claim 1, wherein, to transmit the initiation message, the processor and the memory are configured to utilize communication information associated with the second UAV, the communication information being received in a broadcast message that is previously received from the second UAV.

8. A method, comprising:
- receiving, by the first unmanned aerial vehicle (UAV) from a second UAV, safety information indicating movement of the second UAV in an airspace;
- determining, by the first UAV based at least in part on analyzing the safety information, potential occurrence of a situation related to the movement of the second UAV in the airspace;
- determining, by the first UAV based at least in part on determining the potential occurrence of the situation, that the first UAV and the second UAV are to communicate directly;
- transmitting, by the first UAV to the second UAV based at least in part on determining that the first UAV and the second UAV are to communicate directly, an initiation message to enable establishment of a direct communication session between the first UAV and the second UAV; and
- directly communicating, by the first UAV with the second UAV via the direct communication session, coordination information to coordinate real-time movement of the first UAV or the second UAV to address the potential occurrence of the situation.

9. The method of claim 8, wherein determining the potential occurrence of the situation includes determining that the first UAV is moving in a first path that intersects a second path being followed by the second UAV.

10. The method of claim 8, wherein determining the potential occurrence of the situation includes determining that the first UAV is moving to merge with a path being followed by the second UAV.

11. The method of claim 8, wherein determining the potential occurrence of the situation includes determining that a minimum distance is to be maintained between the first UAV and a second UAV in the airspace.

12. The method of claim 8, wherein determining the potential occurrence of the situation includes determining that the second UAV may meet with a hazard detected by the first UAV in the airspace.

13. The method of claim 8, wherein determining the potential occurrence of the situation includes utilizing an on-board sensor to track real-time movement of the second UAV in the airspace.

14. The method of claim 8, wherein transmitting the initiation message includes utilizing communication information associated with the second UAV, the communication information being received in a broadcast message that is previously received from the second UAV.

15. A non-transitory computer-readable medium configured to store instructions, which when executed by a processor associated with a first unmanned aerial vehicle (UAV) operating in airspace, configure the processor to:
- receive, from a second UAV, safety information indicating movement of the second UAV in the airspace;
- determine, based at least in part on analyzing the safety information, potential occurrence of a situation related to the movement of the second UAV in the airspace;
- determine, based at least in part on determining the potential occurrence of the situation, that the first UAV and the second UAV are to communicate directly;
- transmit, to the second UAV based at least in part on determining that the first UAV and the second UAV are to communicate directly, an initiation message to enable establishment of a direct communication session between the first UAV and the second UAV; and
- directly communicate, with the second UAV via the direct communication session, coordination information to coordinate real-time movement of the first UAV or the second UAV to address the potential occurrence of the situation.

16. The non-transitory computer-readable medium of claim 15, wherein, to determine the potential occurrence of the situation, the processor is configured to determine that the first UAV is moving in a first path that intersects a second path being followed by the second UAV.

17. The non-transitory computer-readable medium of claim 15, wherein, to determine the potential occurrence of the situation, the processor is configured to determine that the first UAV is moving to merge with a path being followed by the second UAV.

18. The non-transitory computer-readable medium of claim 15, wherein, to determine the potential occurrence of the situation, the processor is configured to determine that a minimum distance is to be maintained between the first UAV and a second UAV in the airspace.

19. The non-transitory computer-readable medium of claim 15, wherein, to determine the potential occurrence of the situation, the processor is configured to determine that the second UAV may meet with a hazard detected by the first UAV in the airspace.

20. The non-transitory computer-readable medium of claim 15, wherein, to determine the potential occurrence of the situation, the processor is configured to utilize an on-board sensor to track real-time movement of the second UAV in the airspace.

* * * * *